United States Patent [19]

Park

[11] Patent Number: 5,061,470

[45] Date of Patent: Oct. 29, 1991

[54] SILANE PRODUCTION FROM HYDRIDOMAGNESIUM CHLORIDE

[75] Inventor: Won S. Park, Baton Rouge, La.

[73] Assignee: Ethyl Corporation, Richmond, Va.

[21] Appl. No.: 562,249

[22] Filed: Aug. 3, 1990

[51] Int. Cl.$^5$ .............................................. C01B 33/04
[52] U.S. Cl. ................................... 423/347; 423/498; 423/647
[58] Field of Search ....................... 423/347, 498, 647; 556/474

[56] References Cited

U.S. PATENT DOCUMENTS 4,374,111 2/1983 LeFrancois .......................... 423/347
4,725,419 2/1988 Marlett et al. ...................... 423/347

FOREIGN PATENT DOCUMENTS 1218828 3/1987 Canada .
0052808 6/1982 European Pat. Off. ............ 423/347
0111924 6/1984 European Pat. Off. ............ 423/347

*Primary Examiner*—Olik Chaudhuri
*Assistant Examiner*—Ken Horton
*Attorney, Agent, or Firm*—Terry B. Morris; Richard J. Hammond

[57] ABSTRACT

Improved processes for the production of silane. Hydridomagnesium chloride and trichlorosilane are reacted in an ether solvent to co-produce silane and magnesium chloride. Recycle schemes are presented for the recovery of magnesium values.

12 Claims, No Drawings

SILANE PRODUCTION FROM HYDRIDOMAGNESIUM CHLORIDE

BACKGROUND OF THE INVENTION

The present invention relates in general to metal hydrides and the reaction thereof with silicon halides to produce silane. Silane is a useful commodity in the production of semiconductor grade silicon by any of the various means which recover the silicon by decomposition of the silane.

Production of silane using magnesium hydride is known in the art. For instance, see "Silane Production from Magnesium Hydride", E. M. Marlett and B. G. McKinnie, U.S. Pat. No. 4,725,419 (Issued Feb. 16, 1988). This patent provides a silane production route which recycles magnesium values that would ordinarily be lost or disposed of. However, there remains a need for improved routes to provide silane which recycles magnesium values.

SUMMARY OF THE INVENTION

The present invention is for processes which co-produce silane and magnesium halide. In a preferred embodiment, the magnesium halide is magnesium chloride. Hydridomagnesium chloride reacts with a trihalosilane, preferably trichlorosilane, to provide a good yield of silane. In a cyclic process scheme, the magnesium chloride is reacted with magnesium hydride to produce hydridomagnesium chloride which can be recycled for reaction in the primary reaction. The present invention therefore provides a silane production route which recycles valuable magnesium values.

DESCRIPTION OF THE PREFERRED EMBODIMENTS

In one embodiment, the present invention is a process for producing silane comprising reacting hydridomagnesium chloride with a halosilane. Preferred halosilanes are monohalosilanes, dihalosilanes, trihalosilanes and silicon tetrahalides. Preferred halosilanes are tribromosilane and trichlorosilane; more preferably, trichlorosilane. Alternatively, monochlorosilane, dichlorosilane or silicon tetrachloride can be used but not as preferably as trichlorosilane. Mixtures of dichlorosilane and trichlorosilane can also be used. The reaction is performed in an innocuous liquid reaction media (solvents) for the reaction of hydridomagnesium chloride and trihalosilane. For example, when the trihalosilane is trichlorosilane, the preferred solvent which can be used include tetrahydrofuran, dimethoxyethane, diethylene glycol dimethyl ether, diethyl ether, and dibutyl ether. A more preferred solvent is tetrahydrofuran.

A preferred embodiment of the present invention is a cyclic process for the production of silane, comprising reacting hydridomagnesium chloride and trichlorosilane to produce silane and magnesium chloride, the magnesium chloride being thereafter reacted with magnesium hydride to produce hydridomagnesium chloride which is recycled to produce additional silane.

Preferred methods to react the magnesium chloride and magnesium hydride to produce hydridomagnesium chloride are described in Applicant's co-pending application, U.S. Ser. No. 07/562,224, filed 08/03/90, filed concurrently with this application and incorporated by reference in its entirety herein. In the reaction to prepare hydridomagnesium chloride approximately stoichiometric amounts of magnesium hydride and magnesium chloride in the presence of a solvent can be catalytically reacted (e.g. with triethylaluminum) at a temperature of about 100° C. for a time sufficient to produce the hydridomagnesium chloride.

In the present invention, the quantities of hydridomagnesium chloride (HMgCL) and trichlorosilane can vary. A stoichiometric reaction can be performed in which approximately equal equivalents of hydridomagnesium chloride and trichlorosilane are reacted. However, preferably, an excess of trichlorosilane is used, limited primarily by economics. More preferably, an excess of trichlorosilane in an amount of about at least 50 percent on a equivalent basis.

The reaction between hydridomagnesium chloride and trichlorosilane can be performed in an ether solvent. For example, preferred ether solvents are tetrahydrofuran, di-ethyl ether, dibutyl ether, dimethoxyethane and diethylene glycol dimethylether. Most preferred is tetrahydrofuran. Hydrocarbon solvents, such as toluene, are not effective solvents for the reaction.

The reaction can be performed at any temperature at which the mixture of hydridomagnesium chloride and trichlorosilane can react to produce silane. The temperature should be sufficiently elevated above room temperatures to prevent gelling of the mixture. Preferably, an elevated temperature above about 30° C. is used for the reaction temperature. More preferably, a temperature of from about 50° C. to about 60° C. for the preferred solvent, tetrahydrofuran. Even higher temperatures can be used but can require pressurized reaction media.

Embodiments of this invention can also comprise use of other silicon halides in place of trichlorosilane, such as the disilane, $Si_2Cl_6$.

Another embodiment of the present invention is a process for the production of silane comprising the steps of (a) reacting hydridomagnesium chloride and trichlorosilane in a solvent of tetrahydrofuran at a temperature of from about 50° C. to about 60° C. to co-produce silane and magnesium chloride, said trichlorosilane optionally being in an excess amount, and (b) separating said silane and the magnesium chloride, and optionally comprising the steps (c) and (d) of (c) reacting the magnesium chloride with magnesium hydride to produce hydridomagnesium chloride and return (d) repeating step (a) with the hydro-magnesium chloride formed in step (c).

The optionally excess amount of trichlorosilane can be that as previously stated hereinabove. The optional steps (c) and (d) permit the recycling of the magnesium values as discussed hereinabove. The temperatures in step (a) can be varied, that is, can be elevated, including reacting the hydridomagnesium chloride and trichlorosilane in a pressurized system.

Separation of the components in the reaction media (solid hydridomagnesium chloride, liquid trichlorosilane and solvent, gaseous silane and solid magnesium chloride) are performed by known separation techniques, e.g. filtration, distillation, drying, etc. Accordingly, continuous schemes of operation can be devised as well as batch operations. For instance, a continuous product stream is separated from the gaseous silane product, leaving the solid and liquid components. The liquid is then separated from the remaining solids and recycled. The liquid is typically predominantly solvent when an excess of hydridomagnesium chloride is used to react a substantial amount of the liquid trichlorosilane. The hydridomagnesium chloride and magnesium chloride solids remaining are then be subject to treatment, such as in accordance with the methods of the co-pending application, designated U.S. Ser. No. 07/562,224, filed 08/03/90, to convert the produced magnesium chloride to hydridomagnesium chloride for recycling. In that instance, there is no need to separate the solid components from each other.

Processes in accordance with the present invention can produce a yield of at least 75 percent silane on a basis of total hydridomagnesium chloride used, more preferably being performed so as to produce a yield of at least about 99 percent silane based on the total hydridomagnesium chloride used.

The following experiments illustrate embodiments of the present invention but are not intended to limit the scope of the invention.

Experiment I

Preparation of Hydridomagnesium Chloride 0.53 grams (20 mmoles) of commercially obtained Aldrich magnesium hydride and 1.90 grams (20 mmoles) of magnesium chloride were admixed together with 0.1 mL (0.837 grams, 0.73 mmoles) of triethylaluminum and 20 mL of reagent grade toluene. Admixing was performed in a Fisher-Porter tube in a dry box. The reactor tube was maintained in a 100° C. bath for thirty-six hours. After the thirty-six hours, the product mixture was filtered in a dry box. 20.77 grams of a filtered and 2.40 grams of filtered cake were obtained. The filtrate cake represented a yield of 98.8 percent recovery. X-ray defraction analysis of filtered and dried product determined that the solid product was highly crystalline hydromagnesium chloride. No other compounds were detectable.

Experiment II

Reaction of Magnesium Hydride and 50% Excess Trichlorosilane

Inside a dry box 0.395 grams (15 millimoles) of magnesium hydride ($MgH_2$) were admixed with 20 milliliters tetrahydrofuran (THF) in a three neck flask to create a suspension. An addition funnel was attached to the three neck flask. Inside the addition funnel 2.03 grams (15 millimoles) of trichlorosilane ($HSiCl_3$), which represented a fifty percent stoichmetric excess, was admixed with 10 milliliters of THF. The whole system was flushed with hydrogen. The baths of the silane-collection system were filled with dry ice and liquid nitrogen coolants.

The flask containing the magnesium hydride solution was immersed in an oil bath thermosetted at 60° C. The trichlorosilane solution was added slowly to the flask with vigorous stirring. The mixture was stirred for ninety minutes. The gaseous product was collected in a first liquid nitrogen trap. Silane was distilled for approximately ten minutes at minus 78° C. from a dry ice-acetone trap to a liquid-nitrogen trap with slow hydrogen sweeping.

Analysis (GC-MS and wet methods) disclosed silane production yield of 7.28 millimoles. The 72.8% yield corrected for available hydride represents an 85% corrected yield.

Experiment III

Reaction of Hydridomagnesium Chloride and Trichlorosilane

Hydridomagnesium chloride (HMgCl) was prepared in accordance with the method of Experiment I. 1.82 grams (30 millimoles) of HMgCl were mixed in 32 milliliters of tetrahydrofuran (THF) in a flask, the mixture exhibiting incomplete solubility by the presence of grey HMgCl solids. 1.35 grams (10 millimoles) of trichlorosilane ($SiHCl_3$) was admixed with 13 milliliters of THF in an additional funnel attached to the flask in a dry box. The flask was flushed with $H_2$. Then the $SiHCl_3$ mixture was slowly added. At room temperature, there was no indication of silane formation. Using an oil bath the temperature of the mixture was raised to and maintain at 50° C. for 90 minutes during which reaction occurred with silane formation indicated. Near the end of the 90 minute period, gel formation was observed.

Analysis (GC-MS and wet methods) disclosed production yield of 6.28 millimoles silane out of possible 10 millimoles, with 0.4% $Si_2H_6$ contaminants. The 62.8% yield corrected for available hydride represents a 74% corrected yield.

Experiment IV

Reaction of Hydridomagnesium Chloride and 50% Excess Trichlorosilane

Hydridomagnesium chloride (HMgCl) was prepared in accordance with the method of Experiment I. 1.82 grams (30 millimoles) of HMgCl was mixed in 30 milliliters of THF in a flask, the mixture exhibiting incomplete solubility by the presence of grey HMgCl solids. 2.03 grams (15 millimoles) of trichlorosilane ($SiHCl_3$) in 15 milliliters of THF were added slowly to the HMgCl. This represented a 50% excess of trichlorosilane. The mixture temperature was set at 50° C. by use of an oil bath. The mixture was stirred for 1.5 hours. At about 1.0 hour of the stirring, white precipitation formation was observed, whereas the original grey solids had disappeared.

Analysis (GC-MS and wet methods) disclosed production yield of 8.49 millimoles of silane out of theoretical 10 millimoles possible. No $Si_2H_6$ detected; but trace of $H_2O$ indicated. The 84.9% yield corrected for available hydride represents a 99.9% corrected yield.

Experiment V

Reaction of Magnesium Hydride, Magnesium Chloride and 50% Excess Trichlorosilane Instead of preparing hydridomagnesium chloride in accordance with Experiment I, rather 1.82 grams (15 millimoles) each of magnesium hydride and of magnesium chloride were admixed into a flask containing 30 milliliters of THF. 2.03 grams (15 millimoles) of trichlorosilane in 15 milliliters of THF were slowly admixed with the $MgH_2$-$MgCl_2$ mixture at 50° C. and stirred for 1.5 hours.

Analysis (GC-MS and wet methods) disclosed a yield of 7.59 millimoles of silane out of a theoretical 10 millimoles possible. The 75.9% yield corrected for available hydride represents an 89.3% corrected yield.

| Comparison of Results | | |
|---|---|---|
| Experiment | Conditions | Yield SiH$_4$ |
| II | MgH$_2$, 50% excess HSiCl$_3$, 60° C. | 86.0% |
| III | HMgCl, HSiCl$_3$, 50° C. | 74.0% |
| IV | HMgCl, 50% excess-HSiCl$_3$, 50° C. | 99.9% |
| V | MgH$_2$, MgCl$_2$, 50% excess HSiCl$_3$, 50° C. | 89.0% |

What is claimed is:

1. A process for producing silane comprising reacting hydridomagnesium chloride and a halosilane selected from monohalosilanes, dihalosilanes, trihalosilane and silicon tetrahalides.

2. A process in accordance with claim 1 wherein the halosilane is trichlorosilane.

3. A process in accordance with claim 2 wherein magnesium chloride is also produced, said magnesium chloride being thereafter reacted with magnesium hydride to produce hydridomagnesium chloride which is recycled to produce additional silane.

4. A process in accordance with claim 2 in which about equal equivalents of hydridomagnesium chloride and trichlorosilane are reacted.

5. A process in accordance with claim 2 in which an excess of trichlorosilane is used.

6. A process in accordance with claim 5 in which the excess of trichlorosilane is at least about 50 percent on an equivalent basis.

7. A process in accordance with claim 2 in which the reacting of hydridomagnesium chloride and trichlorosilane is performed in a solvent selected from tetrahydrofuran, dimethoxyethane, diethylene glycol dimethyl ether, dis-ethyl ether, and dibutyl ether.

8. A process in accordance with claim 7 in which the solvent is tetrahydrofuran.

9. A process in accordance with claim 2 wherein the temperature of reaction is elevated above room temperature.

10. A process in accordance with claim 9 wherein the temperature is from about 50° C. to about 60° C.

11. A process for the production of silane comprising the steps of
    (a) reacting hydridomagnesium chloride and trichlorosilane in a solvent of tetrahydrofuran at a temperature of from about 50° C. to about 60° C. to co-produce silane and magnesium chloride, said trichlorosilane optionally being in an excess amount, and
    (b) separating said silane and said magnesium chloride, and optionally comprising the steps (c) and (d) of
    (c) reacting said magnesium chloride with magnesium hydride to produce hydridomagnesium chloride, and
    (d) repeating step (a) with said hydridomagnesium chloride formed in step (c).

12. A process for producing silane comprising reacting hydridomagnesium chloride and trichlorosilane wherein there is produced a yield of at least about 99 percent silane on a basis of total hydridomagnesium chloride used.

* * * * *